United States Patent
Fletcher et al.

(10) Patent No.: US 7,118,838 B2
(45) Date of Patent: Oct. 10, 2006

(54) METHOD, APPARATUS AND MEDIA FOR DISPLAYING INFORMATION

(75) Inventors: James Douglas Fletcher, Bartlett, TN (US); Kangning Liang, Bartlett, TN (US); Mark Anthony Darty, Collierville, TN (US)

(73) Assignee: Brother International Corporation, Bridgewater, NJ (US)

( * ) Notice: Subject to any disclaimer, the term of this patent is extended or adjusted under 35 U.S.C. 154(b) by 0 days.

(21) Appl. No.: 10/810,216

(22) Filed: Mar. 26, 2004

(65) Prior Publication Data

US 2005/0214663 A1 Sep. 29, 2005

(51) Int. Cl.
G03G 17/04 (2006.01)

(52) U.S. Cl. ............. 430/32; 430/34; 430/35; 430/38; 399/131; 359/296; 204/600

(58) Field of Classification Search ........... 430/32, 430/34, 35, 38; 399/131; 359/296; 204/600
See application file for complete search history.

(56) References Cited

U.S. PATENT DOCUMENTS 3,892,568 A * 7/1975 Ota ..................... 430/19
3,919,938 A * 11/1975 Goldberg et al. ............. 430/34
4,123,346 A * 10/1978 Ploix ........................... 359/271
6,172,798 B1 * 1/2001 Albert et al. ............... 359/296
6,512,626 B1 * 1/2003 Schmidt ..................... 359/296
2004/0119680 A1 * 6/2004 Daniel et al. ............... 345/107

* cited by examiner

Primary Examiner—Mark A. Chapman
(74) Attorney, Agent, or Firm—Reed Smith LLP (57) ABSTRACT

An apparatus for forming an image using an electrophoretic particle suspension containing media including: a transitioner for sufficiently lowering a viscosity of the suspension to facilitate mobility of at least some of the electrophoretic particles; and, imaging electrodes for selectively providing an imaging electric field associated with the image to be formed and positioned with respect to the transitioner such that the imaging electric field impinges upon the lowered viscosity suspension; wherein, the imaging electric field is sufficient to cause select ones of the electrophoretic particles in the lowered viscosity suspension to migrate depending upon the image to be formed. The media includes a plurality of substrates defining an interior hollow including an electrophoretic particle containing, phase-transitional suspension suitable for enabling migration of the electrophoretic particles responsively to an applied electric field in a first state and substantially impeding migration of the particles in a second state.

23 Claims, 8 Drawing Sheets

Field Electrodes of the Printing Apparatus

Figure 5B

Field Electrodes of the Printing Apparatus

METHOD, APPARATUS AND MEDIA FOR DISPLAYING INFORMATION

FIELD OF THE INVENTION

The present invention relates generally to information display, and more particularly to a method and apparatus for printing and displaying information using a re-usable media including electrophoretic particles.

BACKGROUND OF THE INVENTION

Information reproduction has matured from manual reproduction using handwriting and hand written drawings to printed documents. For example, printing presses and then printing devices such as dot matrix, laser and inkjet technology printers have matured significantly. Nonetheless, each of these technologies typically uses media, that once imaged, or is used to display information, it is not suitable for re-use.

It is believed to be desirable to provide a portable media, which may be used to display information and then re-used, as well as an apparatus for imaging such media.

SUMMARY OF THE INVENTION

An apparatus for forming an image using an electrophoretic particle suspension containing media including: a transitioner for sufficiently lowering a viscosity of the suspension to facilitate mobility of at least some of the electrophoretic particles; and, imaging electrodes for selectively providing an imaging electric field associated with the image to be formed and positioned with respect to the transitioner such that the imaging electric field impinges upon the lowered viscosity suspension; wherein, the imaging electric field is sufficient to cause select ones of the electrophoretic particles in the lowered viscosity suspension to migrate depending upon the image to be formed. The media includes a plurality of substrates defining an interior hollow including an electrophoretic particle containing, phase-transitional suspension suitable for enabling migration of the electrophoretic particles responsively to an applied electric field in a first state and substantially impeding migration of the particles in a second state.

BRIEF DESCRIPTION OF THE FIGURES

Understanding of the present invention will be facilitated by consideration of the following detailed description of the preferred embodiments taken in conjunction with the accompanying drawings, in which like numerals refer to like parts, and.

DETAILED DESCRIPTION OF THE PREFERRED EMBODIMENTS

Figure 1:
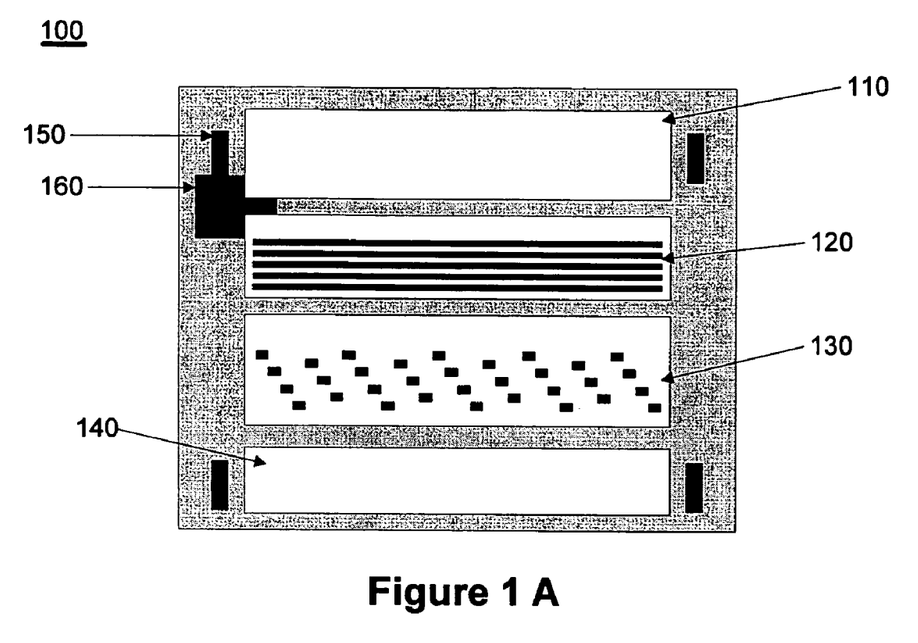
FIGS. 1A and 1B illustrate block diagrammatic representations of an apparatus according to an aspect of the present invention.

Referring now to FIGS. 1A and 1B, there are shown top and side block diagrammatic views of a printing device 100 according to an aspect of the present invention, respectively. Device 100 may include a heating region 110, mixing region 120, writing region 130 and cooling region 140. Device 100 may further include rollers 150 and edge sensor 160. According to an aspect of the present invention, heating region 110, mixing region 120, writing region 130, cooling region 140, rollers 150 and edge sensor 160 may help define an imaging path that media progresses along during an imaging process.

According to an aspect of the present invention, device 100 may be used to form images in or on a media including electrophoretic particles. For non-limiting purposes of completeness only, electrophoretic particles may be electrically charged to cause particle migration toward an opposite charge or away from a like charge. Electrophoretic particles may be suspended in a fluid such that inducing an electric field across the suspension causes the particles to migrate in such a way that desired images corresponding to the field are formed by the particles.

According to an aspect of the present invention, device 100 may be used to form images in or on a media that may include a phase transitional, such as heat transitional, material, like a wax-type material, by way of non-limiting example only. Such a material may be of a form at room temperature and pressure such that is serves to substantially fix the electrophoretic particles in place. Such a material may be phase transitioned, such as by being made less viscous, to allow electrophoretic particles to migrate responsively to an applied electric field. Accordingly, any material that provides for selectable viscosity changes in the electrophoretic particle containing mixture or suspension, such as in response to heating or radiation for example, may be used.

Referring still to FIGS. 1A and 1B, heating region 110, if present, may be designed to heat the media thereby preparing it for imaging. Heating region 110 may heat the media to cause an electrophoretic particle containing suspension in the media to decrease in viscosity. According to an aspect of the present invention, heating region 110 may heat the mixture in the media to a temperature sufficient to keep the decreased viscosity of the mixture as the media progresses through writing region 130. By way of non-limiting example only, heating region 110 may heat media progressing through it to approximately 30 degrees Celsius or more. Heating region 110 may be of sufficient size such that media progressing along the media path may be heated for a long enough temporal period to allow phase transition of a portion of the media. For example, it may take a portion of media passing along the media imaging path approximately 2 seconds or less to traverse heating portion 110, where device 100 throughput is about 6–8 pages per minute. Alternately, the heating region may be incorporated into the mixing and writing regions (a parallel process) such that the media is heated throughout the imaging path until it is ready to be cooled.

Heating region 110 may include at least one heating element 112 (not shown). Heating element 112 may include one or more resistive heating elements, such that when energized, heat is applied to media passing though region 110. Heating element 112 may include a single or multiple heating plates, which may be positioned on a platen, for example. Heating element 112 may include a single or multiple radiation heating elements, which may be positioned on a platen, for example. Again for non-limiting purposes of completeness only, a platen is generally a flat plate or rolling cylinder that positions media to be imaged and holds it during imaging. For example, a single heating element 112 may be placed on a platen, such as an upper or lower platen in a media processing path. If multiple heating elements 112 are used, they may be placed on both the upper and lower platen, by way of non-limiting example only. In other words, one or more heating elements may be positioned in one or more of an upper and/or lower platen in the media imaging path.

Mixing region 120 may include one or more mixing elements 122 (not shown). Region 120, if present, may be suited to mix the electrophoretic particle containing suspension in the media. This may occur, in part, with the low viscosity state induced by heating region 110. Mixing region 120 may serve to induce alternating, shifting or substantially random migration of electrophoretic particles within media passing through region 120, thereby causing a more homogenous distribution of electrophoretic particles in the media. Further, mixing region 120 may be designed to drive the mixture with a particular bias, such as making the media or mixture black, white, or somewhere in between such as a gray. Such a mixing region 120 may predominately serve to provide a starting point for a writing process. This starting point may be predetermined and associated with the mixing process and may also ameliorate potential sticking problems of electrophoretic particles during writing. This known starting point may allow for more expedient and consistent writing by writing region 130.

Referring still to FIGS. 1A and 1B, writing region 130 may serve to impart an electric field onto or through media progressing on the media path through region 130. Such an electric field may be designed to cause charged particles within the mixture to move, such as toward a top or bottom, or front or back, of the media, dependently on the applied field. This field may be applied using electrode pairs, for example. By controlling the field at a given electrode, for example, an image correspondent to the field may be formed on the media as electrophoretic particles within the media migrate as the media is carried on platens or rollers 150 through region 130.

Cooling region 140, if present, may serve to cool the media. This cooling of the media may cause the viscosity transitioning material to transition to a higher viscosity, thereby substantially reversing the heat applied in the heating region 110, and serving to substantially re-fix the electrophoretic particles in their newly migrated place. According to an aspect of the present invention, instead of providing a specific cooling region 140, or in addition to cooling region 140, cooling of the media or viscosity re-transition may occur in the media path after heating region 110. According to an aspect of the present invention, cooling region 140 may serve to allow media to cool itself, or facilitate cooling by forcing air over the media, using a blower, for example.

Rollers 150 may take the form of a platen. These rollers, as is known to those possessing an ordinary skill in the pertinent arts, synchronize movement of the media within device 100 along the media path. This may be achieved by using an electronic control unit that synchronizes roller 150 speed and therefore the position of the media. Rollers 150 may control media passing along the media path to allow an electric field to write the media for a given pixel such that the image may be faithfully formed, for example.

Edge sensor 160, if present, may sense the edge or some particular location in the media, such as alignment marks or apertures, and provide feedback to the electronic control unit driving roller 150. Sensor 160 may serve multiple purposes in device 100. For example, by sensing the edge or some portion of the media, sensor 160 may provide a general reference aiding in image locating. Further, the control unit described herein above may be able to synchronize application of electric fields with the position of the media, thereby better insuring that the appropriate pixel is being written correspondent with the desired image.

Figure 2:
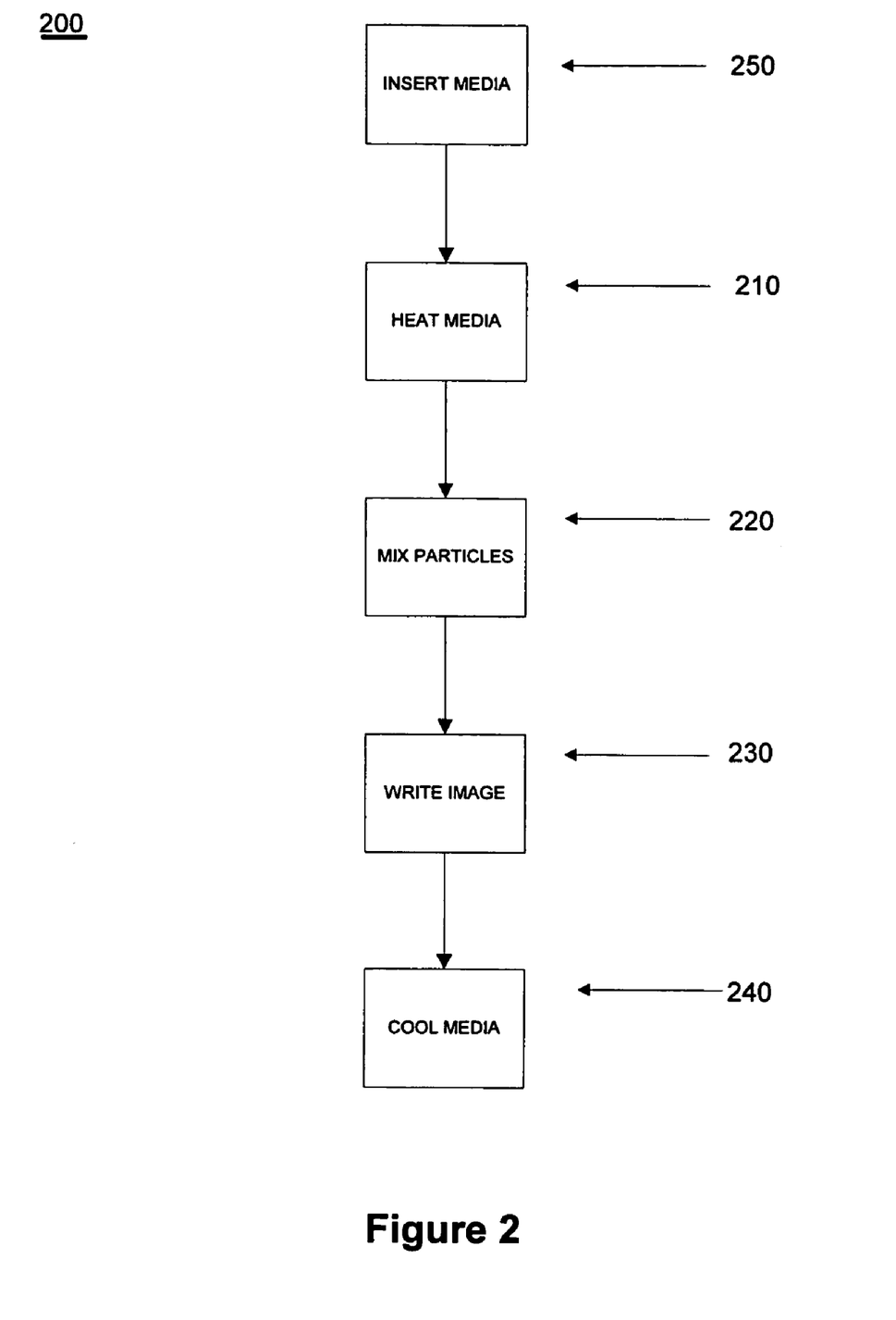
FIG. 2 illustrates a flow chart of a method suitable for use with the device of FIGS. 1A and 1B according to an aspect of the present invention.

Referring now to FIG. 2, there is shown a flow chart of a method suitable for use with the device of FIGS. 1A and 1B according to an aspect of the present invention. Method 200 may include inserting media 250, heating media 210, mixing the particles contained within the media 220, writing the image to the media 230, and cooling the media 240. Insertion 250 may be accomplished by causing media to be imaged to become engaged by rollers 150. Heating 210 may be accomplished by heating region 110. Mixing 220 may be accomplished using mixing region 120. Mixing may also be at least partially responsive to heating region 110, through thermal mixing of the electrophoretic particle containing mixture, for example. Writing 230 may be accomplished using writing region 130. Finally, cooling 240 may be at least partially accomplished using cooling region 140.

Figure 3A:
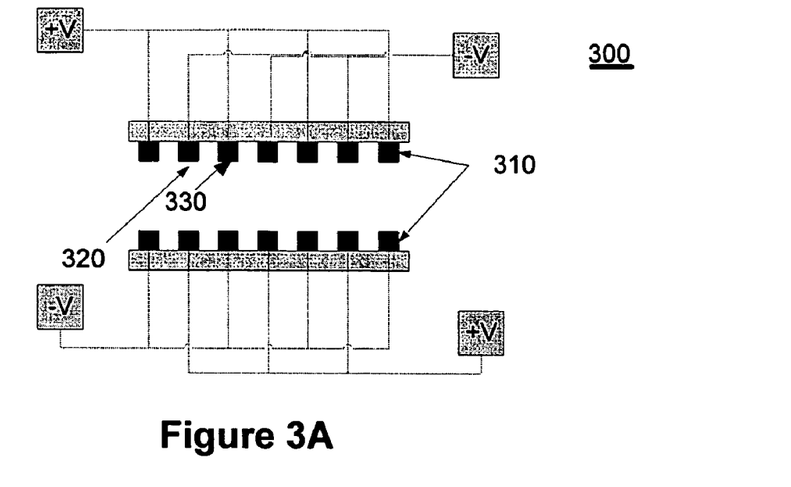
FIGS. 3A, 3B and 3C illustrate diagrammatic views of mixing elements suitable for use with the device of FIGS. 1A and 1B according to aspects of the present invention.

Referring now to FIG. 3A, there is shown a diagrammatic view of a mixing element 300 suitable for use with the device of FIGS. 1A and 1B according to an aspect of the present invention. Mixing element 300, as shown in FIG. 3A, may include aligned patterns of conductive strips 310. Conductive strips 310 may be aligned in pairs in a vertical configuration across the media path. Each vertical pair may have a given potential, and coordinated pairs 320 and 330 may have different potentials. For example, adjacent pairs may have substantially opposite potentials. The potential of a pair may be kept substantially constant.

According to an aspect of the present invention, an about 0.4V/um (volts per micrometer) to 4.0 V/um electric field may be suitable for causing the particles to migrate effectively. Given a suitably viscous mixture though, other field strengths, such as 0.25V/um may be suitable. The media thickness may be approximately 150 um to 250 um; such that the media path thickness may be approximately the same or about 50 um thicker. Voltages applied to induce the migration may be about 50V (0.25 V/um at a 200 um electrode separation) to about 1200V (4.0V/um at a 300 um electrode separation).

Figure 3B:
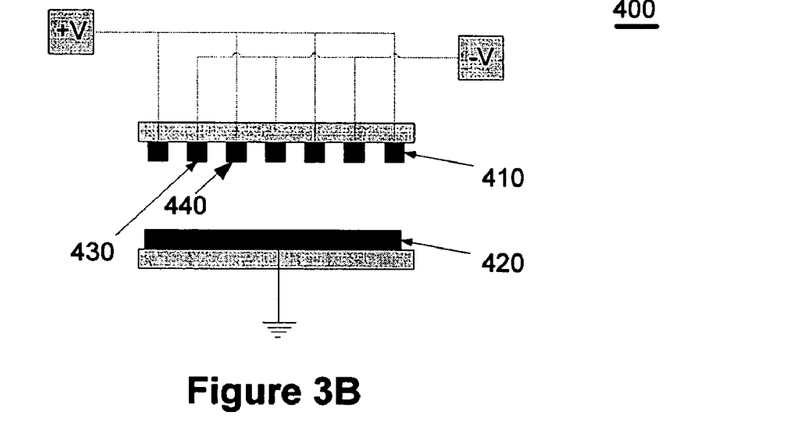

Referring now to FIG. 3B, there is shown a diagrammatic view of a mixing element 400 suitable for use with the device of FIGS. 1A and 1B according to an aspect of the present invention. Mixing element 400, as shown in FIG. 3B, may include conductive strips 410 oriented on one platen, the top platen as shown, and a common conductor 420 on an opposite platen, the bottom platen as shown. The space between the strips 410 and conductor 420 may again be suitable for passing the media. Common conductor 420 may be substantially potentially grounded. Similar to the configuration of FIG. 3A, coordinated strips 430 and 440 may have different potentials and again kept substantially constant.

Figure 3C:
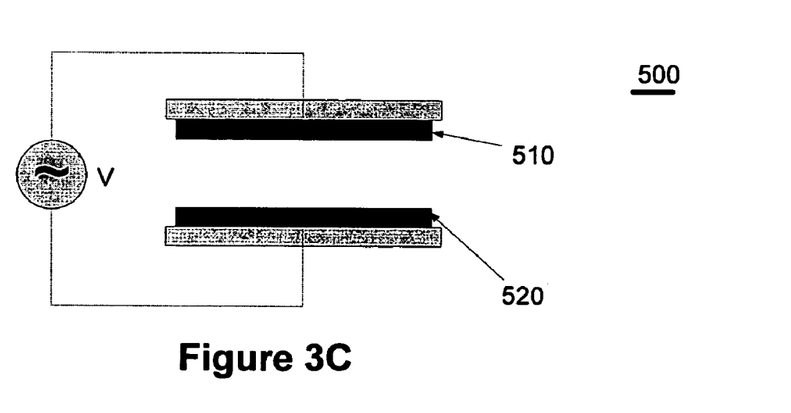

Referring now to FIG. 3C, there is shown a diagrammatic view of a mixing element 500 suitable for use with the device of FIGS. 1A and 1B according to an aspect of the present invention. Mixing element 500, as shown in FIG. 3C, may include at least two conductive plates 510 and 520 spaced to allow the media to pass. An alternating voltage (there may be essentially no current flow because there may be an almost perfect capacitor) may be applied to conductive plates 510 and 520.

According to an aspect of the present invention, potentials applied to the constructive strips, regardless of whether the construction of FIG. 3A, 3B or 3C is used, may be configured to temporally change in frequency and/or magnitude to facilitate a thorough migration of electrophoretic particles into a more homogenous distribution. This may serve also to erase previously written images on the media, thereby rendering the media more homogenous and re-usable in nature, for example.

Figure 4A:
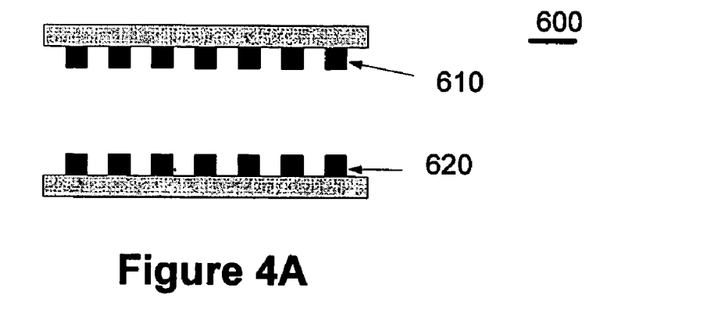
FIGS. 4A, 4B, 4C, 4D, 4E and 4F illustrate diagrammatic views of writing elements suitable for use with the device of FIGS. 1A and 1B according to aspects of the present invention.

Referring now to FIG. 4A, there is shown a diagrammatic view of a writing element 600 suitable for use with the device of FIGS. 1A and 1B according to an aspect of the present invention. Writing element 600, as shown in FIG. 4A, may include an aligned pattern of fixed electrodes 610, 620. Electrodes 610 and 620 may be aligned across a gap that forms a part of the media path. By way of non-limiting example only, when a resolution of the media is 300 dpi, and the media has a width of 11 inches, 3300 electrodes per platen may be provided in a regular pattern, where two platens are used. As is shown in FIG. 4A, multiple rows of electrodes may correspond to a single vertical pixel, as is conventionally used in ink-jet printing technology, where media movement is used to provide vertical resolution and individual electrode spacing provides transverse or horizontal resolution. Each of the electrodes may be individually excitable in a grid pattern for example, and correspond to a given pixel to be imaged, for example. In this way, electrophoretic particles may be migrated with substantially pixel selectivity.

Figure 4B:
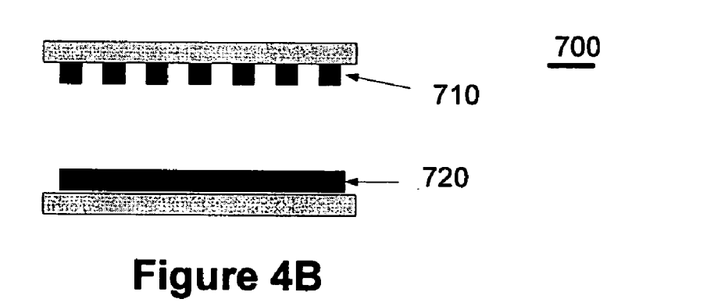

Referring now to FIG. 4B, there is shown a diagrammatic view of a writing element 700 suitable for use with the device of FIGS. 1A and 1B according to an aspect of the present invention. Writing element 700, as shown in FIG. 4B, may include electrodes 710 and a common conductor 720, each of which may be fixed in position. Electrodes 710 and conductor 720 may be spaced to allow the media to pass. Conductor 720 may be substantially potentially grounded. By way of non-limiting example only, for 300 dpi media, 11 inches wide, 3300 electrodes 710 may be provided.

Figure 4C:
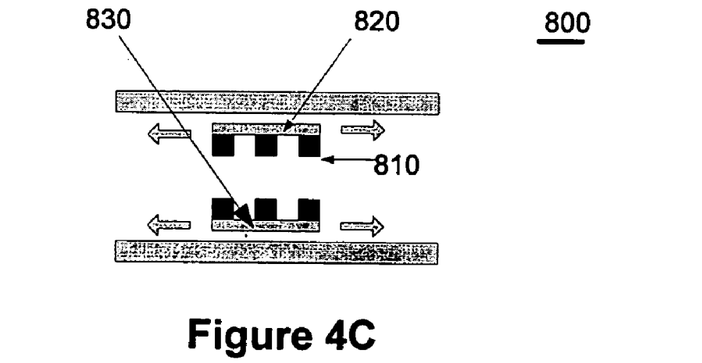

Referring now to FIG. 4C, there is shown a diagrammatic view of a writing element 800 suitable for use with the device of FIGS. 1A and 1B according to an aspect of the present invention. The configuration of writing element 800 shown in FIG. 4C may serve to reduce the overall number of electrodes, as compared to elements 600, 700. Writing element 800 may include electrodes 810 located on a pair of selectively positionable substrates 820, 830. The substrates may be fixed with respect to one another. Substrates 820 and 830 may form a gap sized to allow the media to pass. In this configuration, substrates 820, 830 may move across the media while writing less than an entire row of data at a given time. For purposes of completeness, movement of the substrates 820, 830 may serve to provide for scanning in a horizontal direction, similar to ink-jet or dot-matrix printers, while movement of the media provides for vertical resolution.

Figure 4D:
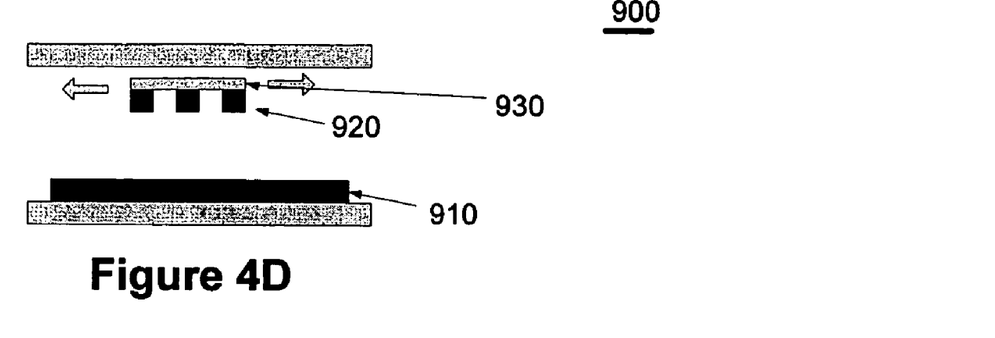

Referring now to FIG. 4D, there is shown a diagrammatic view of a writing element 900 suitable for use with the device of FIGS. 1A and 1B according to an aspect of the present invention. Similar to the configuration of FIG. 4C, the configuration of FIG. 4D may reduce the overall number of electrodes for a specific resolution. Writing element 900, as shown in FIG. 4D, may include a common conductor 910 and an array of electrodes 920 located on a substrate 930. Conductor 910 and electrodes 920 may be spaced apart creating a gap there between. This gap may be suited to allow the media to pass. Conductor 910 may be substantially potentially grounded.

Figure 4E:
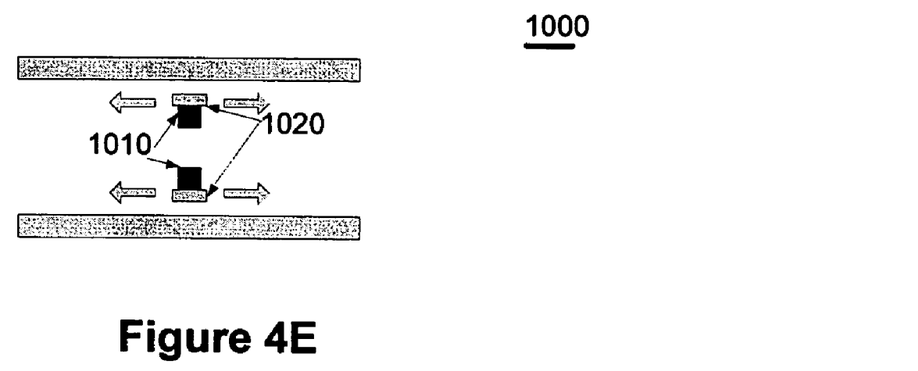

Referring now to FIG. 4E, there is shown a diagrammatic view of a writing element 1000 suitable for use with the device of FIGS. 1A and 1B according to an aspect of the present invention. Further reducing the number of electrodes, the configuration of FIG. 4E may include a single pair of electrodes 1010 located on substrates 1020. The pair of substrates 1020 may be spaced such that a gap is formed there between. This gap may be suited to allow a media to pass.

Figure 4F:
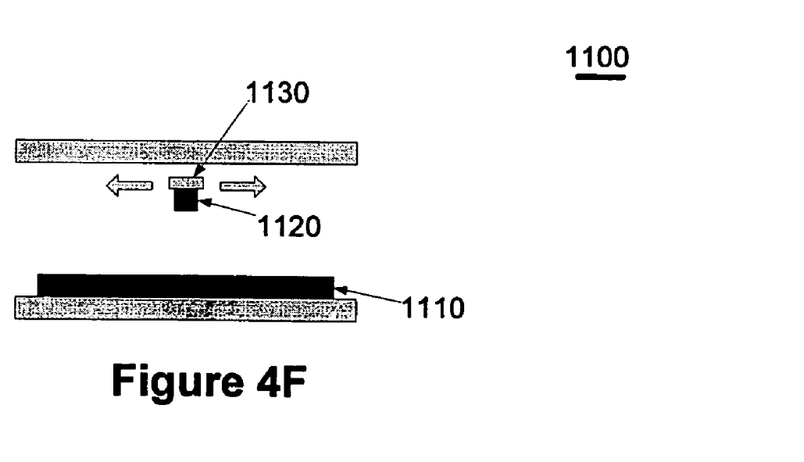

Referring now to FIG. 4F, there is shown a diagrammatic view of a writing element 1100 suitable for use with the device of FIGS. 1A and 1B according to an aspect of the present invention. Writing element 1100, as shown in FIG. 4F, may include a common conductor 1110 and a single electrode 1120 located on a positionable substrate 1130. Conductor 1110 may be substantially potentially grounded. Conductor 1110 and electrode 1120 may create a gap there between suitable for passing media.

According to an aspect of the present invention, media passed through device 100 may include a thermally sensitive mixture sandwiched between two substrates. The mixture may include field-sensitive particles, such as electrophoretic particles, in a suspension, for example. Such a suspension may exist in a thermally sensitive fluid. This fluid may have a higher viscosity at room temperature and lower viscosity at an elevated temperature. The mixture may change contrast in response to an applied electric field by particle migration toward a top or bottom substrate of the media in response to the polarity of the field.

According to an aspect of the present invention, the media substrates may be largely made out of thin plastic films such as polymer thin films of polyesters (polyethylene terephalate) or polymethacrylates. These materials may be used to compartmentalize or enclose the medium. According to an aspect of the present invention, one of the substrates may be substantially transparent and the other substantially opaque to facilitate viewing of the particles through the substantially transparent substrate.

By way of non-limiting example, the thermally sensitive mixture may appear substantially opaque or semi-translucent in a high viscosity state. The closer this mixture is to opaque, the less multiple colorant particles may be needed. For example, if the mixture is opaque, a single colorant particle may be used. In this configuration, a single polarity may be used to create contrast variations. However, if the mixture is transparent in the high viscosity state, multiple colorant particles may be used. Multiple colorant particles may be used to create improved contrast. By way of non-limiting example only, the first of two colorants may have an opposite polarity surface charge of the second of the two colorants. Oppositely charging the colorants may result in the first colorant be driven to the top substrate, while the second colorant may be driven to the bottom substrate, responsively to an applied electric field. In order to invert the drive force, the polarity of the electric field may be reversed.

By way of further non-limiting example only, a suspension suitable for use with the device of FIGS. 1A and 1B may include an isoparaffin-based formulation, such as an isopar, containing black and white toner particles that may be used as a display medium under a switching electric field. Isoparaffin formulations may include paraffin, such as paraffin wax. Paraffin wax may be a solid at room temperature and a liquid at elevated temperatures. This temperature dependence of paraffin wax reacts similarly with black and white toner particles. After a desired image has been formed through particle migration at an elevated temperature, the media may be cooled to allow the paraffin wax to become a solid thereby substantially fixing the toner particles in their migrated place. By way of non-limiting example only, an exemplary formulation may include paraffin wax, hexyl alcohol, black toner and white toner. This mixture may include by weight 85 g of paraffin wax, 15 g of hexyl alcohol, 7.6 g of black toner, and 14.4 g of white toner and may be combined by conventional methods.

The desired melting temperature of the medium may range from 25 to 100° C., depending on the application. In addition to hexyl alcohol, other alcohols, such as octyl alcohol, decyl alcohol, or other alcohols known to those possessing an ordinary skill in the pertinent arts may also be used as an additive to the formulation to improve the display performance. The diameter of the toner particles may range from about 3 to about 10 microns, with the white and black particles carrying opposite charges. Other additives may include organic amines such as hexyl amine, octyl amine, decyl amine, or other amines.

Figure 5A:
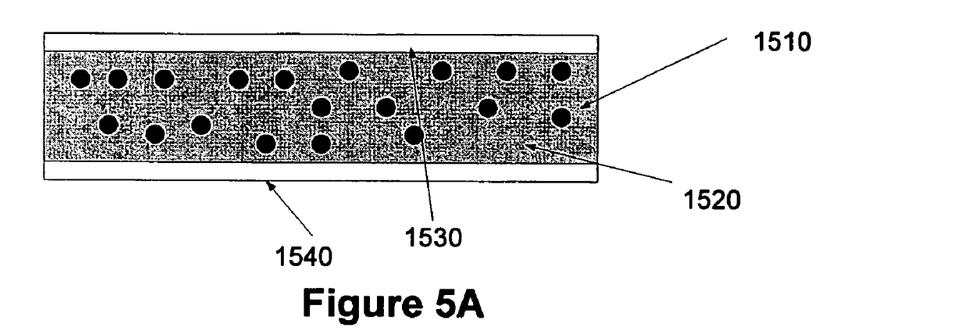
FIGS. 5A, 5B, 5C, 5D, 5E and 5F illustrate media incorporating a colorant according to aspects of the present invention; and, FIG. 6 illustrates a diagrammatic view of a method and apparatus for forming a media suitable for use with the device of FIGS. 1A and 1B.

Referring now to FIG. 5A, there is shown a non-limiting embodiment of a media incorporating a single colorant according to an aspect of the present invention. Specifically, colorant particles 1510 may be positioned or contained within phase change material 1520. This mixture may be contained by two substrates 1530, 1540. As may be seen in FIG. 5A, colorant particles 1510 may be suspended in material 1520.

Figure 5B:
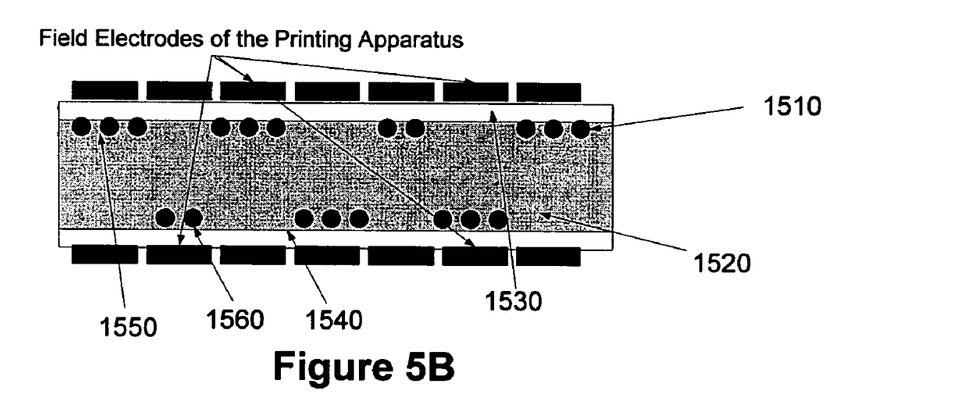

Referring now to FIG. 5B, there is shown a non-limiting single colorant embodiment of the media being acted upon by an electric field according to an aspect of the present invention. As may be seen in FIG. 5B, a polarity acting on the media may drive colorant 1510 toward a specific side of the material 1520. In particular, the first set of colorant 1550 may have been driven toward substrate 1530, while a second set of colorant 1560 may have been driven toward substrate 1540. The electric field may be reversed for each successive pair in FIG. 5B, for example.

Figure 5C:
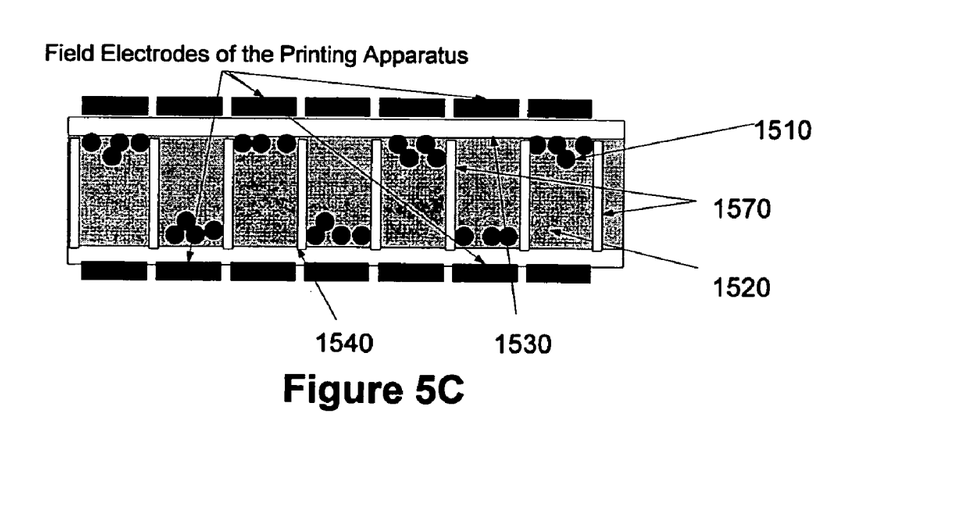

Referring now to FIG. 5C, there is shown a non-limiting, single colorant embodiment of the media incorporating cavity walls according to an aspect of the present invention. As may be seen in FIG. 5C, similar to that described above with respect to FIGS. 5A and 5B, a colorant 1510 may be contained within a phase change material 1520. Cavity walls 1570 may be formed to contain a subset of colorant 1510. In FIG. 5C, three or four colorant particles are depicted within each cavity 1570, however in actuality there may be thousands of colorant particles within each cavity. For example, at 300 dpi, a pixel surface area is approximately 7200 um$^2$. If each particle is approximately 3 um in diameter, it would require about 1000 particles to fill a single layer in the surface area of the cavity. According to an aspect of the present invention, multiple layers, such as 3 or more layers, may be used to provide for improved contrast, such that over 3000 particles may be used per cavity. Fewer particles may be used if they are larger in diameter. The segmenting into cavities may be accomplished by rolling impressions into one or both of the media substrates, or separating the media substrates with a fabricated grating made of plastic or polyimide for example. According to an aspect of the present invention, cavities may serve to better keep the particles confined to the pixel area when in a low viscosity state thereby insuring a more uniform distribution of the particles throughout the media and therefore a more uniform image.

Figure 5D:
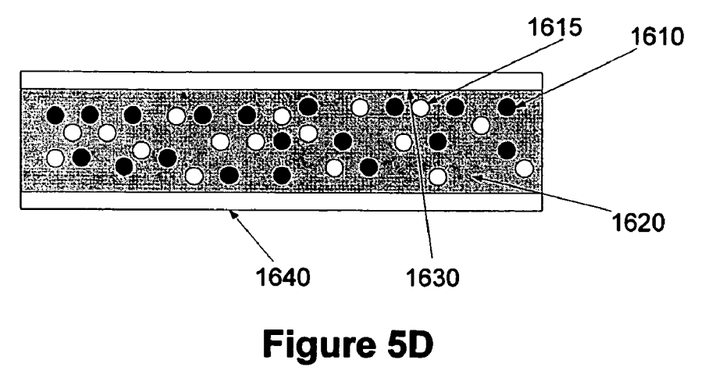

Referring now to FIG. 5D, there is shown a non-limiting embodiment of a media incorporating two colorants according to an aspect of the present invention. As may be seen in FIG. 5D, a first colorant 1610 and a second colorant 1615 may be contained within phase change material 1620. Similar to the single colorant embodiment discussed above, this mixture may be contained by two substrates 1630, 1640. As may be seen in FIG. 5D, colorants 1610, 1615 may be suspended in material 1620.

Figure 5E:
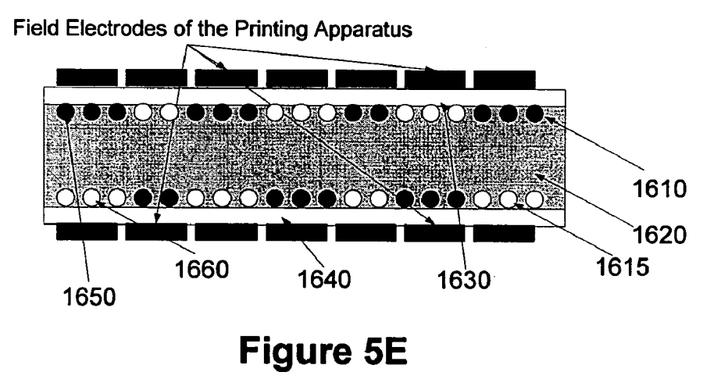

Referring now to FIG. 5E, there is shown a non-limiting colorant embodiment of a media being acted upon by an electric field according to an aspect of the present invention. As may be seen in FIG. 5E, a polarity acting on the media may drive colorant 1610 toward a specific side of the material 1620, while substantially simultaneously driving colorant 1615 toward the opposite side of material 1620. In particular, colorant 1650 may have been driven toward substrate 1630, while colorant 1660 may have been driven toward substrate 1640. The electric field may be reversed for each successive pair in FIG. 5E.

Figure 5F:
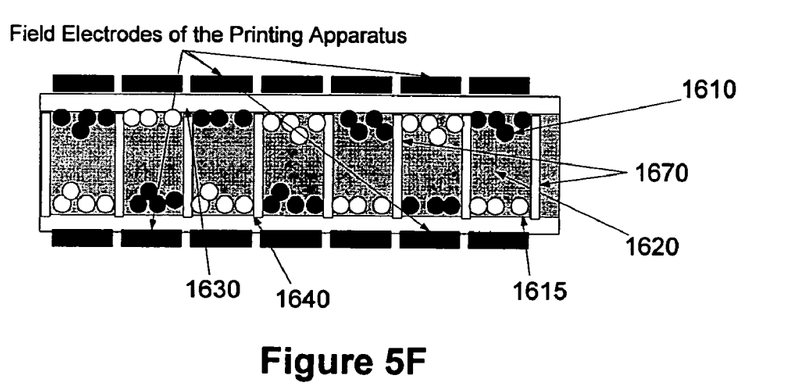

Referring now to FIG. 5F, there is shown a non-limiting colorant embodiment of the media incorporating cavity walls according to an aspect of the present invention. As may be seen in FIG. 5F, similar to that described above with respect to FIGS. 5D and 5E, a first colorant 1610 and a second colorant 1615 may be contained within phase change material 1620. Cavity walls 1670 may be formed to contain a subset of colorant 1610, 1615. In FIG. 5F, three or four colorant particles of each of the two colorants are depicted within each cavity 1670, however in actuality there may be thousands of colorant particles within each cavity. The segmenting into cavities may be accomplished by rolling impressions into one or both of the media substrates, or separating with a fabricated grating made of plastic or polyimide for example.

Figure 6:
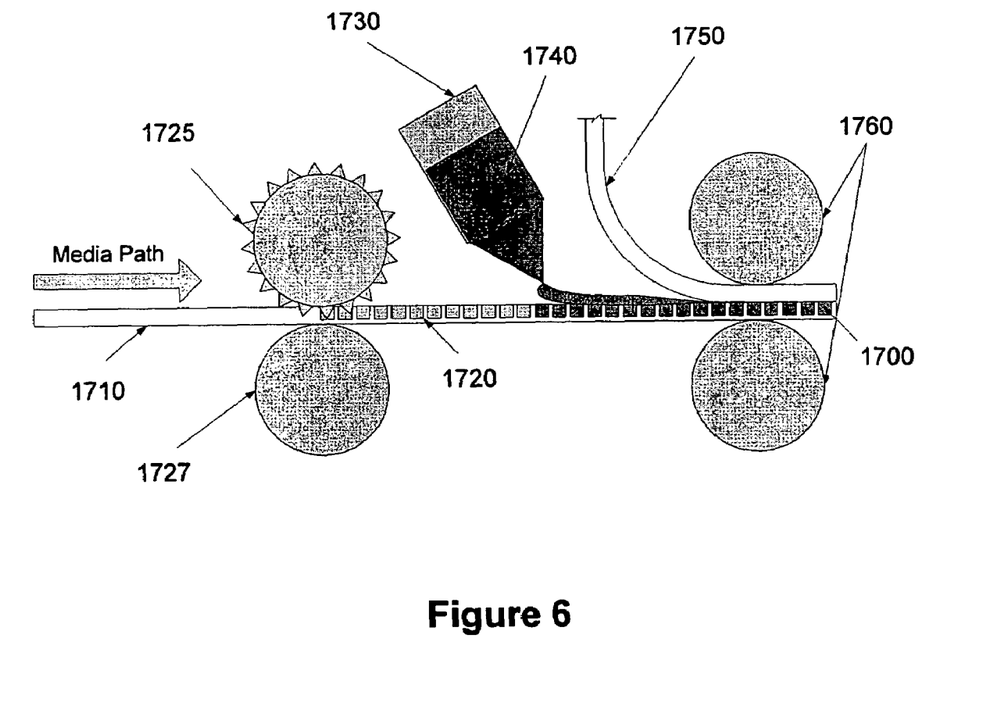

Referring now also to FIG. 6, according to an aspect of the present invention media to be imaged may include first and second substrates 1710, 1750. One of the media substrates, 1710 in the example illustration, may be indented with cavities 1720. Cavities 1720 may be embossed into substrate 1710 that has been heated to make it more pliable and softer using an embossing roller 1725 and pressure roller 1727. After cavities 1720 have been formed, a media injector 1730 may inject media fluid 1740 onto substrate 1710. The second media substrate 1750 may then be placed and aligned on top of the first substrate 1710 in a conventional manner. Pressure rollers 1760 may press the two substrates 1710, 1750 together forming the completed media 1700.

According to an aspect of the present invention, media injector 1730 may heat the media fluid to make it a lower viscosity. Further, the media may optionally contain conductor elements that may be used to help keep the electrophoretic particles within the fluid in suspension by applying an alternating voltage across the fluid. According to an aspect of the present invention, different colored particles may be deposited into select ones of the cavities in a patterned fashion. For example, adjacent cavities may contain red, blue and green particles, or magenta, yellow and cyan particles, respectively.

According to an aspect of the present invention, one or more of media substrates 1710, 1750 may be coated with a pressure and/or heat sensitive material that fuses the material together when acted upon by the pressure rollers 1760. Depending on the adhesion materials, pressure rollers 1760 may optionally be heated to aid in the fusing process.

According to an aspect of the present invention, cavities may be indented on both substrates. Such cavities may be aligned via a sensor. According to an aspect of the present invention, a thin layer of media fluid may be spread onto a substrate without cavities, controlling the thickness with a squeegee method. According to an aspect of the present invention, a mesh layer may be inserted with prefabricated cavities between the substrates. According to an aspect of the present invention, laser etching of the substrate may be employed instead of rolling cavities into the substrate. According to an aspect of the present invention, an epoxy adhesive may be used instead of a thermal adhesive. According to an aspect of the present invention, instead of coating the surface with one or more adhesives, substantially only the edges may be sealed, optionally with one or more epoxies, for example. According to an aspect of the present invention, instead of heating the fluid mixture to a low viscosity, it can be applied at room temperature in a higher viscosity state to facilitate a uniform distribution of electrophoretic particles across the surface.

Those of ordinary skill in the art will recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A printing apparatus for forming an image in a recording media containing an electrophoretic particle suspension comprising:
   a transitioner for sufficiently lowering a viscosity of the suspension to facilitate mobility of at least some of the electrophoretic particles;
   imaging electrodes for selectively providing an imaging electric field associated with a portion of the image to be formed and positioned with respect to said transitioner such that said imaging electric field impinges upon said lowered viscosity suspension;
   wherein, said imaging electric field is sufficient to cause select ones of the electrophoretic particles in said lowered viscosity suspension to migrate to form said image portion;
   a transfer mechanism adapted to position said imaging electrodes near a portion of the recording media to allow said imaging electrodes to progressively form the image.

2. The printing apparatus of claim 1, wherein said transitioner comprises at least one heating element.

3. The printing apparatus of claim 2, wherein said at least one heating element comprises at least one resistive heating element.

4. The printing apparatus of claim 1, wherein said transitioner comprises a plurality of heating elements.

5. The printing apparatus of claim 1, wherein said transitioner comprises at least one heating plate coupled to a platen.

6. The printing apparatus of claim 1, further comprising mixing electrodes suitable for providing a mixing electric field suitable for causing the electrophoretic particles in said viscosity lowered suspension to more homogeneously distribute in the suspension before being impinged upon by said imaging electric field.

7. The printing apparatus of claim 6, wherein media having said homogenous distribution appears gray.

8. The printing apparatus of claim 6, wherein said mixing electrodes comprise conductive strips.

9. The printing apparatus of claim 8, wherein said mixing electrodes further comprise a common conductor.

10. The printing apparatus of claim 9, wherein said common conductor is substantially potentially grounded.

11. The printing apparatus of claim 8, wherein at least one of said strips has a different potential than another of said strips.

12. The printing apparatus of claim 6, wherein said mixing electric field fluctuates.

13. The printing apparatus of claim 6, wherein said mixing electric field is between about 0.25 V/um to about 4.0 V/um.

14. The printing apparatus of claim 1, wherein said imaging electrodes comprise an array of fixed electrodes.

15. The printing apparatus of claim 14, wherein said imaging electrodes further comprise a fixed conductor.

16. The printing apparatus of claim 15, wherein said fixed conductor is substantially potentially grounded.

17. The printing apparatus of claim 14, wherein each of said fixed electrodes are substantially individually excitable.

18. The printing apparatus of claim 17, wherein excitement of at least one of said fixed electrodes causes a color change in a corresponding portion of the media.

19. The printing apparatus of claim 1, wherein at least one of said imaging electrodes is movable.

20. The printing apparatus of claim 1, further comprising a re-transitioner for facilitating increasing of the viscosity of the suspension to impede mobility of at least some of the electrophoretic particles subsequent to electrophoretic particle migration.

21. The printing apparatus of claim 1, wherein said transfer mechanism comprises at least one roller for moving said media between said transitioner and imaging electrodes.

22. The printing apparatus of claim 1, further comprising at least one sensing mechanism for facilitating aligning the media and writing electrodes.

23. A method for forming an image in a recording media containing an electrophoretic particle suspension comprising:
   lowering a viscosity of the suspension to facilitate mobility of at least some of the electrophoretic particles; and,
   using imaging electrodes to selectively provide an imaging electric field associated with a portion of the image to be formed to act upon the lowered viscosity suspension;
   wherein, said imaging electric field is sufficient to cause select ones of the electrophoretic particles in said lowered viscosity suspension to migrate to form said image portion;
   positioning said imaging electrodes near a portion of the recording media to allow said imaging electrodes to form said image portion;
   repeating the step of using imaging electrodes to selectively provide an imaging electric field and the step of positioning said imaging electrodes until the image is formed.

* * * * *